United States Patent
Hurley

(10) Patent No.: US 7,293,132 B2
(45) Date of Patent: Nov. 6, 2007

(54) APPARATUS AND METHOD FOR EFFICIENT DATA STORAGE USING A FIFO MEMORY

(75) Inventor: William M. Hurley, Wylie, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 10/680,949

(22) Filed: Oct. 8, 2003

(65) Prior Publication Data

US 2005/0081003 A1    Apr. 14, 2005

(51) Int. Cl.
*G06F 5/12*    (2006.01)

(52) U.S. Cl. .................... 711/110; 710/52; 709/234

(58) Field of Classification Search ........... 711/100, 711/135, 136, 160, 110; 365/180, 230; 370/395.72; 709/234; 345/558; 375/372; 710/52
See application file for complete search history.

(56) References Cited

U.S. PATENT DOCUMENTS

| | | | | |
|---|---|---|---|---|
| 4,949,301 A * | 8/1990 | Joshi et al. | ................. | 711/100 |
| 5,133,062 A * | 7/1992 | Joshi et al. | ................... | 703/13 |
| 5,311,475 A * | 5/1994 | Huang | ........................ | 365/221 |
| 6,327,625 B1* | 12/2001 | Wang et al. | ................ | 709/235 |
| 6,650,640 B1* | 11/2003 | Muller et al. | ............... | 370/392 |
| 6,778,546 B1* | 8/2004 | Epps et al. | ................. | 370/413 |
| 6,934,296 B2* | 8/2005 | Shimojo | .................... | 370/428 |
| 2005/0030962 A1* | 2/2005 | Hou | ........................... | 370/412 |

OTHER PUBLICATIONS

Kruse et al., Data Structures and Program Design in C, 1991, Prentice Hall Inc., pp. 68-75.*

* cited by examiner

*Primary Examiner*—Brian R. Peugh
*Assistant Examiner*—Jared I Rutz

(57) ABSTRACT

A first-in, first-out (FIFO) memory apparatus, a device, and a method include a memory that can store a data packet. A length of the data packet and the data packet are stored in the memory and the length and the data packet are flushed from the memory when the data packet is invalid.

20 Claims, 3 Drawing Sheets

APPARATUS AND METHOD FOR EFFICIENT DATA STORAGE USING A FIFO MEMORY

TECHNICAL FIELD OF THE INVENTION

This disclosure relates generally to data storage devices and, more specifically, to an apparatus and method for efficient data storage in a digital logic device.

BACKGROUND OF THE INVENTION

First-in, first-out (FIFO) memories are a common component for buffering data in digital devices. In a conventional FIFO memory, data is stored or "pushed" into the memory in sequential locations. The data is then read or "popped" from the memory in the same order in which it was pushed into the memory. In other words, the first data stored in the memory is the first data read from the memory.

FIG. 2 illustrates conventional first-in, first-out (FIFO) memory 200 according to an exemplary embodiment of the prior art. In this example, memory 200 includes random access memory (RAM) 205, write pointer 210, read pointer 215, and comparator 220. Data is stored in RAM 205 during a "push" operation, where data is presented to RAM 205 and a PUSH signal is asserted. The data is then stored starting at the memory location identified by write pointer 210. Write pointer 210 is then incremented to point to the next starting memory location in RAM 205. When write pointer 210 reaches the last memory location in RAM 205, write pointer 210 is reset to point to the first memory location in RAM 205. In this way, incoming data is stored in RAM 205 in a circular fashion.

Data is read from RAM 205 during a "pop" operation. A POP signal is asserted, and data stored in the memory location identified by read pointer 215 is retrieved. The retrieved data is then output, and read pointer 215 is incremented to point to the next memory location in RAM 205. When read pointer 215 reaches the last memory location in RAM 205, read pointer 215 is reset to point to the first memory location in RAM 205. In this way, data is read from RAM 205 in a circular fashion.

Depending on how quickly the data is written to or read from RAM 205, write pointer 210 and read pointer 215 may point to the same memory location in RAM 205. Comparator 220 compares the memory locations output by write pointer 210 and read pointer 215 to determine when RAM 205 is full or empty. For example, when write pointer 210 is incremented, comparator 220 compares write pointer 210 and read pointer 215. If they are equal, this indicates that data has been stored in the last free memory location of RAM 205, and comparator 220 outputs a signal indicating that RAM 205 is full. Similarly, when read pointer 215 is incremented, comparator 220 compares write pointer 210 and read pointer 215. If they are equal, this indicates that data has been read from the last un-read memory location of RAM 205 and comparator 220 outputs a signal indicating that RAM 205 is empty.

A problem with conventional FIFO memories, such as the one shown in FIG. 2, is that RAM 205 takes up a large amount of space in an integrated circuit. RAM 205 also typically represents a large portion of the cost of the integrated circuit. Moreover, the data received by the FIFO memory is often contained in data packets, which may have variable sizes. To handle data packets of variable size, RAM 205 stores data packets in memory slots, where each slot is large enough to store the biggest data packet expected. To keep RAM 205 from overflowing, RAM 205 also typically includes a large number of memory slots for storing a large number of data packets. This typically increases the size of RAM 205, which also increases the size and cost of the integrated circuit that uses RAM 205. This also means that at least a portion of RAM 205 is often wasted because it is not used to store data.

Therefore, there is a need in the art of an improved buffer circuit for use in a network device. In particular, there is a need for an improved FIFO memory that efficiently buffers data packets of varying sizes in a router or other network device.

SUMMARY OF THE INVENTION

The present invention provides an apparatus and method for efficient data storage in a digital logic device.

To address the above-discussed deficiencies of the prior art, it is a primary object of the present invention to provide a first-in, first-out memory apparatus that includes a memory operable to store a data packet. The memory apparatus also includes circuitry operable to store a length of the data packet and the data packet in the memory. The memory apparatus further includes circuitry operable to flush the length and the data packet from the memory when the data packet is invalid.

In another aspect, a method for storing data in a first-in, first-out memory includes receiving a data packet and storing a length of the data packet and the data packet in the first-in, first-out memory. The method also includes flushing the length and the data packet from the memory when the data packet is invalid.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
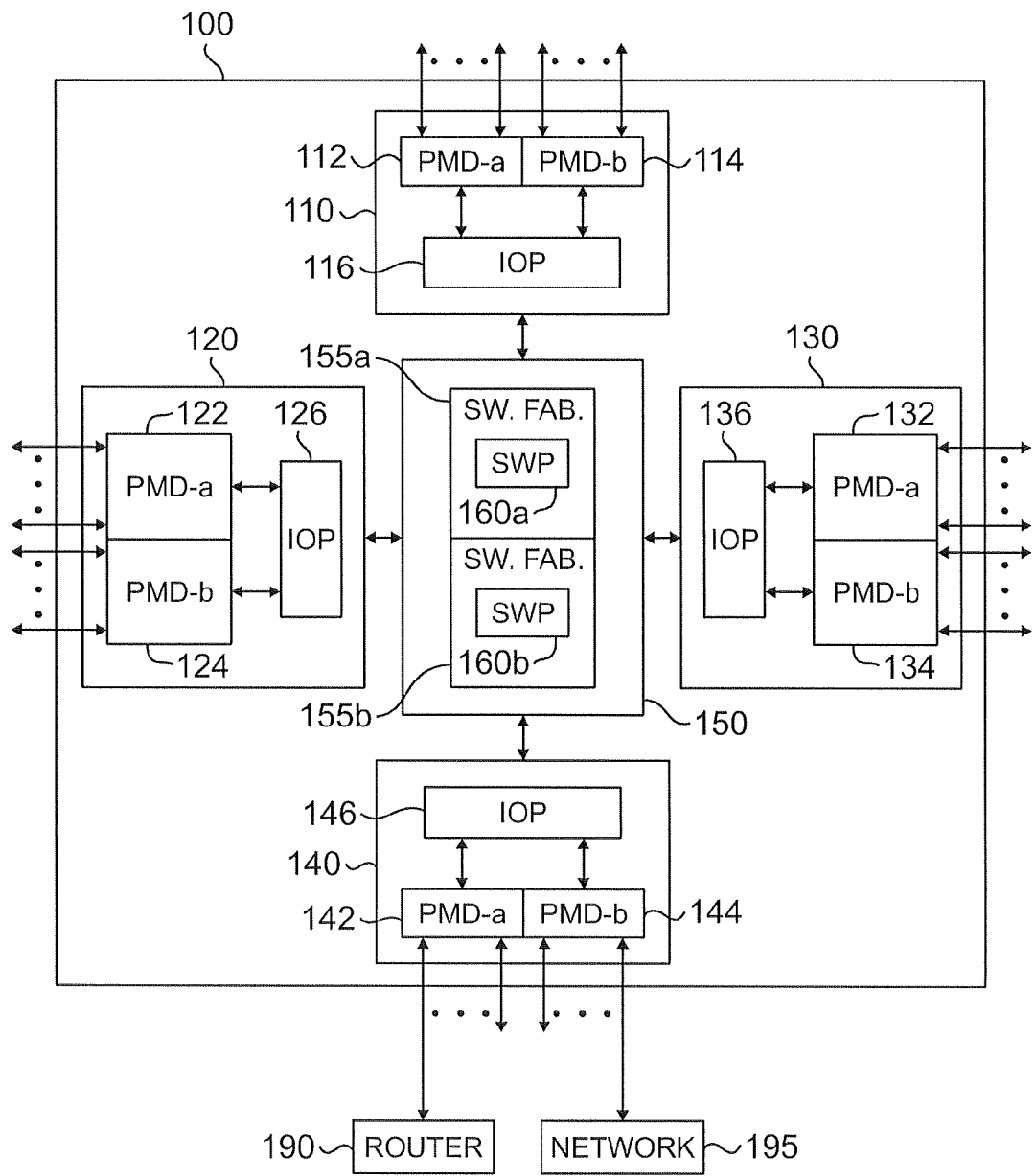
FIG. 1 illustrates an exemplary router in which a FIFO memory according to the principles of the present invention may be implemented.
Figure 2:
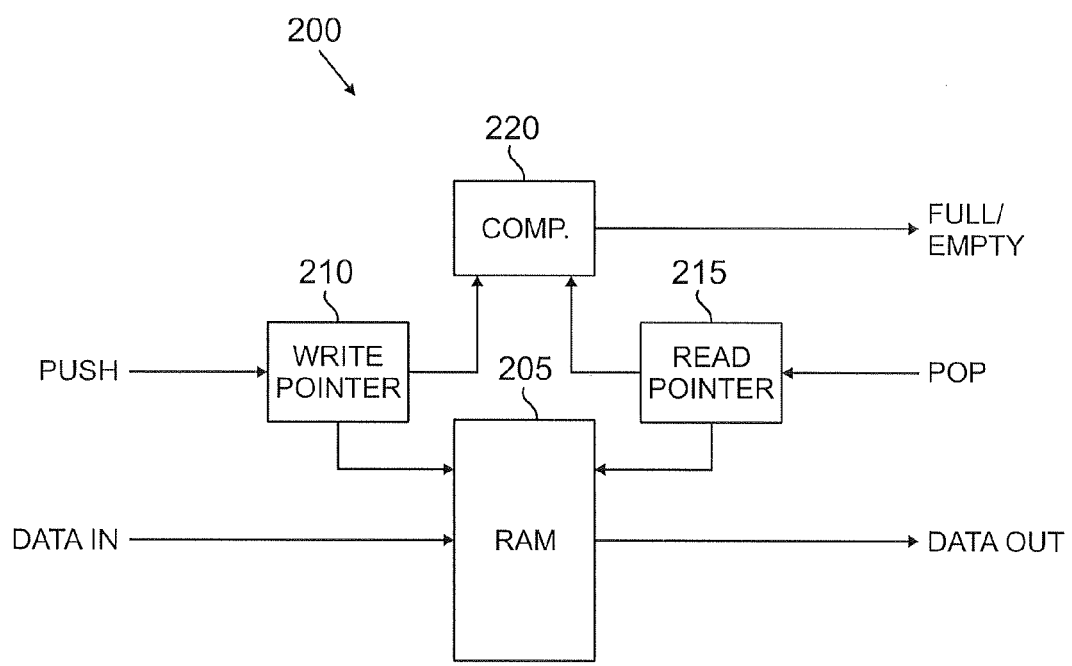
FIG. 2 illustrates a conventional first-in first-out (FIFO) memory according to an exemplary embodiment of the prior art.
Figure 3:
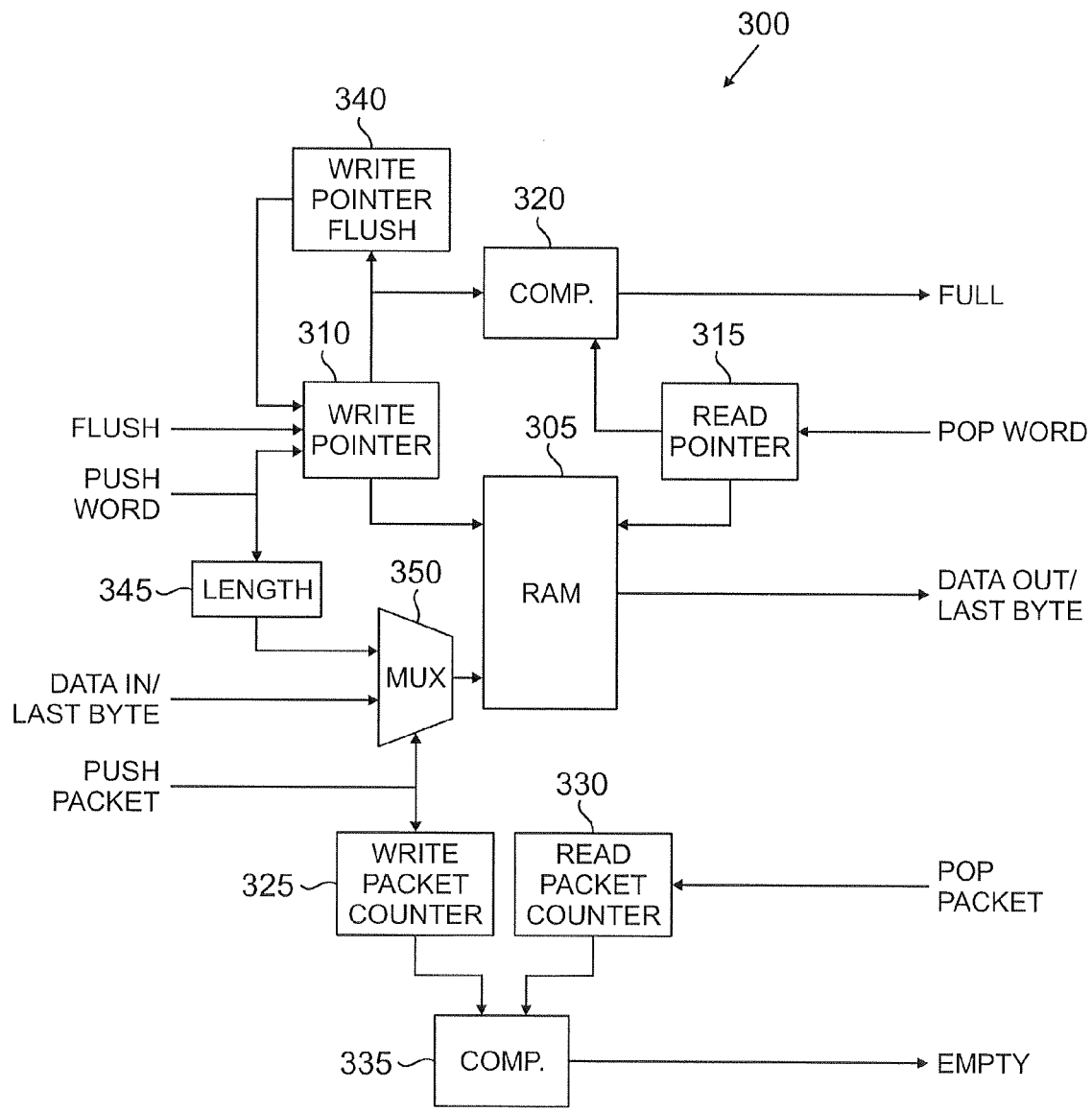
FIG. 3 illustrates a conventional first-in first-out (FIFO) memory according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital communication device.

FIG. 1 illustrates an example router 100 using one or more first-in, first-out (FIFO) memories according to one embodiment of this disclosure. Router 100 provides scalability and high performance using up to N independent routing nodes (RN) connected by a switch. In this example, router 100 includes routing nodes 110, 120, 130 and 140 connected by switch 150. Switch 150 includes a pair of high-speed switch fabrics 155a and 155b. Each routing node includes an input-output processor (IOP) module and one or more physical medium device (PMD) modules. In this example, RN 110 includes PMD module 112 (labeled PMD-a), PMD module 114 (labeled PMD-b), and IOP module 116. RN 120 includes PMD module 122 (labeled PMD-a), PMD module 124 (labeled PMD-b), and IOP module 126. RN 130 includes PMD module 132 (labeled PMD-a), PMD module 134 (labeled PMD-b), and IOP module 136. Finally, RN 140 includes PMD module 142 (labeled PMD-a), PMD module 144 (labeled PMD-b), and IOP module 146.

Each one of IOP modules 116, 126, 136 and 146 buffers incoming Internet Protocol (IP) frames and MPLs frames from subnets or adjacent routers, such as router 190 and network 195. Additionally, each of IOP modules 116, 126, 136 and 146 classifies requested services, looks up destination addresses from frame headers, and forwards frames to outbound IOP modules. Moreover, each IOP module also maintains an internal routing table determined from routing protocol frames and provisioned static routes and computes the optimal data paths from the routing table. Each IOP module processes an incoming frame from one of its PMD modules. According to one embodiment of this disclosure, each PMD module frames an incoming packet, frame, cell, or other group of data from an IP network, switch, or other source for processing in an IOP module and performs bus conversion functions.

In some embodiments, each one of routing nodes 110, 120, 130 and 140, configured with an IOP module and PMD module(s), is essentially equivalent to a router by itself. Thus, router 100 can be considered a distributed architecture router having a set of RN building blocks with high-speed links (i.e., switch fabrics 155a and 155b) connected to each block. Switch fabrics 155a and 155b support frame switching between IOP modules. Switch processor (SWP) 160a and switch processor (SWP) 160b, located in switch fabrics 155a and 155b, respectively, support system management.

An exemplary FIFO memory that can be used in router 100 to buffer data is shown in FIG. 3 and described below. FIFO memory 300 could, for example, be used in the IOP modules or in the PMD modules. Router 100 shown in FIG. 1 represents only one example of a device in which one or more FIFO memories may be used to buffer data. Any other or additional devices could use the FIFO memory shown in FIG. 3 without departing from the scope of this disclosure. In addition, other types of routers could use the FIFO memory shown in FIG. 3.

FIG. 3 illustrates an example first-in, first-out (FIFO) memory 300 according to one embodiment of this disclosure. The FIFO memory 300 shown in FIG. 3 is for illustration only. Other embodiments of the FIFO memory 300 may be used in router 100 or in another device without departing from the scope of this disclosure.

The FIFO memory 300 includes a random access memory (RAM) 305. The RAM 305 represents any suitable memory or memories for storing and facilitating retrieval of information. The RAM 305 may have any suitable size according to particular needs.

A write pointer 310 identifies the starting location in the RAM 305 where incoming data is stored. When data is stored in the location identified by the write pointer 310, the write pointer 310 may be incremented to identify a new location in the RAM 305. Similarly, a read pointer 315 identifies the starting location in the RAM 305 where outgoing data may be retrieved. When data is read from the location identified by the read pointer 315, the read pointer 315 may be incremented to identify a new location in the RAM 305. Each of the pointers 310, 315 may be reset to point to the beginning of the RAM 305 when the end of the RAM 305 is reached. Each of the pointers 310, 315 includes any hardware, software, firmware, or combination thereof for identifying a location in the RAM 305.

A comparator 320 determines when the RAM 305 is full. The comparator 320 receives and compares the memory locations identified by the write pointer 310 and the read pointer 315. When the memory locations are the same, the comparator 320 asserts a FULL signal indicating that the RAM 305 is full. Otherwise, the comparator 320 determines that the RAM 305 is not full. The comparator 320 includes any hardware, software, firmware, or combination thereof for comparing at least two values.

As shown in FIG. 3, the comparator 320 does not output a signal identifying when the RAM 305 is empty. A write packet counter 325, a read packet counter 330, and a comparator 335 are used in the FIFO memory 300 to determine whether the RAM 305 is empty. The write packet counter 325 is incremented each time a data packet is received and stored in the RAM 305. The read packet counter 330 is incremented each time a data packet is read from the RAM 305. In the illustrated example, the write packet counter 325 is triggered in response to a PUSH PACKET signal, which is described below. The read packet counter 330 is triggered by a POP PACKET signal, which is also described below. Each counter 325, 330 includes any hardware, software, firmware, or combination thereof for counting values.

The comparator 335 identifies when the RAM 305 is empty by comparing the values output by the write packet counter 325 and the read packet counter 330. When the values output by the counters 325, 330 are equal, all of the data packets stored in the RAM 305 have been read from the RAM 305, so the RAM 305 is considered empty. Otherwise, at least one un-read data packet remains in the RAM 305, so the RAM 305 is not empty. In this document, a memory is considered "empty" when the valid data written into the memory has been read from the memory. The memory may be referred to as being empty even though data is still actually stored in the memory. Moreover, the phrases "packet" and "data packet" refer to any grouping of data, whether in the form of an IP packet, an Asynchronous Transfer Mode (ATM) cell, a frame relay frame, or other group. The comparator 335 includes any hardware, software, firmware, or combination thereof for comparing at least two values.

The use of the counters 325, 330 and the comparator 335 allows the FIFO memory 300 to identify the number of complete data packets that are available for retrieval in the RAM 305. Conventional FIFO memories, such as the FIFO memory of FIG. 2, are typically unable to identify when a complete data packet has been received and stored in the FIFO memory.

The FIFO memory 300 also includes a write flush pointer 340. The write flush pointer 340 allows the FIFO memory 300 to identify and flush an invalid data packet being stored in the RAM 305. For example, the write flush pointer 340 may maintain the starting location in RAM 305 where a data packet is currently being stored. If the device in which the FIFO memory 300 operates determines that the data packet being stored is invalid, the write flush pointer 340 updates the write pointer 310 so that the write pointer 310 points to the memory location stored in the write flush pointer 340. In effect, this causes the write pointer 310 to point to the starting location in RAM 305 where the invalid packet was being stored. The next data packet received is then stored over the invalid packet. The write flush pointer 340 includes any hardware, software, firmware, or combination thereof for storing the starting address of a data packet being stored.

The use of the write flush pointer 340 allows the FIFO memory 300 to discard invalid data packets. Conventional FIFO memories, such as the FIFO memory of FIG. 2, are typically unable to identify and flush an invalid data packet without requiring the use of large amounts of extra memory in the RAM 205. The use of the write flush pointer 340 helps to reduce the amount of memory needed to flush invalid data packets.

The FIFO memory 300 further includes a length unit 345. As described above, the data packets stored in the RAM 305 may have variable lengths. The length unit 345 receives or identifies the length of the data packet to be stored in the RAM 305 and writes the length in the RAM 305. As an example, the length unit 345 may write the length of the data packet at one memory location in the RAM 305, and the data packet is stored beginning at the next memory location in the RAM 305. The length unit 345 includes any hardware, software, firmware, of combination thereof for storing the length of a data packet in the RAM 305. In some embodiments, the write flush pointer 340 points to the memory location in which the length of the data packet is stored.

A multiplexer 350 is used to provide the length of a data packet and the data packet itself to the RAM 305 for storage. The output of the multiplexer 350 may be controlled in any suitable manner. For example, the multiplexer 350 may use the state of the PUSH PACKET signal to determine whether to output the length of a data packet from the length unit 345 or the data packet itself. The multiplexer 350 includes any hardware, software, firmware, or combination thereof for outputting one of multiple signals to the RAM 305.

In one aspect of operation, a device that uses the FIFO memory 300 begins to receive a data packet. Assuming that the RAM 305 is not full, the device begins presenting the data packet to the FIFO memory 300 and asserts the PUSH WORD signal. The device then receives the end of the data packet and sends a DATA IN/LAST BYTE signal to the FIFO memory 300. After determining that the data packet is valid, the device asserts the PUSH PACKET signal.

The PUSH PACKET signal causes the write packet counter 325 to be incremented. It also triggers the length unit 345 to write the length of the data packet to the memory location identified by the write pointer 310. After that, the data packet and the LAST BYTE signal are written to the RAM 305 using the memory location identified by the write pointer 310.

Later, the device may retrieve the data packet from the FIFO memory 300. The device asserts a POP WORD signal, which retrieves the value at the memory location identified by the read pointer 315. The location identified by the read pointer 315 represents the location at which the size of the data packet was stored by the length unit 345. As a result, the POP WORD signal causes the retrieval of the data packet size from the RAM 305. After that, additional words are popped from the RAM 305 until the DATA OUT/LAST BYTE signal is detected, at which point the data packet has been retrieved from the RAM 305. The device then asserts a POP PACKET signal, which causes the read packet counter 330 to increment its value.

If the device detects an error in the data packet being stored before the PUSH PACKET signal is asserted, the device can assert the FLUSH signal. This causes the write flush pointer 340 to reset the write pointer 310 to the memory location where the length of the current data packet was stored in the RAM 305. When another data packet is received, the length of the new packet and the new packet itself overwrite the previously stored invalid packet.

In this way, the FIFO memory 300 has a similar interface as conventional FIFO memories 200. Also, the FIFO memory 300 allows for the flushing of invalid or other data when needed, and it helps to more efficiently utilize the RAM 305 by reducing or minimizing memory requirements and cost.

Although FIG. 3 illustrates one example of a FIFO memory 300, various changes may be made to FIG. 3. For example, the FIFO memory 300 could include any other or additional functionality. As particular examples, the FIFO memory 300 could include grey code conversion for pointers and circuitry to reset the FIFO memory 300 when catastrophic errors occur.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a digital device, a first-in, first-out memory apparatus comprising:
    a memory operable to store a data packet;
    circuitry operable to store a length of the data packet and the data packet in the memory;
    circuitry operable to flush the length and the data packet from the memory when the data packet is invalid;
    a first counter operable to identify a number of data packets stored in the memory;
    a second counter operable to identify a number of data packets retrieved from the memory; and
    a first comparator operable to compare outputs of the first counter and the second counter and to generate a signal indicating the memory is empty when the outputs are equal.

2. The apparatus as set forth in claim 1, wherein: the length and data packet comprise a plurality of words; and
    the circuitry for storing the length and data packet in the memory comprises a first pointer operable to identify a location in the memory, wherein the first pointer is advanced for each word written to the memory.

3. The apparatus as set forth in claim 2, wherein the circuitry for storing the length and data packet further comprises:
a length unit operable to provide the length of the data packet; and
a multiplexer operable to selectively provide each of the length and the data packet to the memory.

4. The apparatus as set forth in claim 2, wherein the circuitry for flushing the length and data packet from the memory comprises an additional pointer operable to identify the first location in the memory where one of the words is stored, the location identified by the additional pointer being used as the first pointer when the data packet is flushed.

5. The apparatus as set forth in claim 2, further comprising circuitry for retrieving the data packet from the memory.

6. The apparatus as set forth in claim 5, wherein the circuitry for retrieving the data packet comprises a second pointer operable to identify a location in the memory where a word is to be retrieved.

7. The apparatus as set forth in claim 1, wherein the first counter is triggered in response to a PUSH PACKET signal, and the second counter is triggered by a POP PACKET signal.

8. The apparatus as set forth in claim 1, wherein:
the circuitry for storing the length and data packet in the memory comprises a first pointer; and
the apparatus further comprises:
circuitry for retrieving the data packet comprising a second pointer;
a second comparator operable to compare outputs of the pointers and to generate a signal indicating that the memory is full when the outputs are equal.

9. A digital device comprising:
at least one interface operable to receive and communicate data packets; and
a first-in, first-out memory comprising:
a memory operable to store a data packet; circuitry operable to store a length of the data packet and the data packet in the memory;
circuitry operable to flush the length and the data packet from the memory when the data packet is invalid;
a first counter operable to identify a number of data packets stored in the memory;
a second counter operable to identify a number of data packets retrieved from the memory; and
a first comparator operable to compare outputs of the counters and to generate a signal indicating the memory is empty when the outputs are equal.

10. The digital device as set forth in claim 9, wherein:
the length and data packet comprise a plurality of words; and
the circuitry for storing the length and data packet in the memory comprises a first pointer operable to identify a location in the memory, wherein the first pointer is advanced for each word written to the memory.

11. The digital device as set forth in claim 10, wherein the circuitry for storing the length and data packet further comprises:
a length unit operable to provide the length of the data packet; and
a multiplexer operable to selectively provide each of the length and the data packet to the memory.

12. The digital device as set forth in claim 10, wherein the circuitry for flushing the length and data packet from the memory comprises an additional pointer operable to identify the first location in the memory where one of the words is stored, the location identified by the additional pointer being used as the first pointer when the data packet is flushed.

13. The digital device as set forth in claim 10, further comprising circuitry for retrieving the data packet from the memory, the circuitry for retrieving the data packet comprising a second pointer operable to identify a location in the memory where a word is to be retrieved.

14. The digital device as set forth in claim 9, wherein:
the circuitry for storing the length and data packet in the memory comprises a first pointer; and
the digital device further comprises:
circuitry for retrieving the data packet comprising a second pointer; and
a second comparator operable to compare outputs of the pointers and to generate a signal indicating that the memory is full when the outputs are equal.

15. For use in a digital device, a method for storing data in a first-in, first-out memory, comprising:
receiving a data packet;
storing a length of the data packet and the data packet in the first-in, first-out memory;
flushing the length and the data packet from the memory when the data packet is invalid;
incrementing a first counter for each data packet stored in the memory;
incrementing a second counter for each data packet retrieved from the memory; and
comparing outputs of the counters and generating a signal indicating the memory is empty when the outputs are equal.

16. The method as set forth in claim 15, wherein:
the length and data packet comprise a plurality of words; and
storing the length and data packet in the memory comprises using a first pointer operable to identify a location in the memory, wherein the first pointer is advanced for each word written to the memory.

17. The method as set forth in claim 16, wherein flushing the length and data packet from the memory comprises using an additional pointer operable to identify the first location in the memory where one of the words is stored, the location identified by the additional pointer being used as the first pointer when the data packet is flushed.

18. The method as set forth in claim 16, further comprising retrieving the data packet from the memory using a second pointer operable to identify a location in the memory where a word is to be retrieved.

19. The method as set forth in claim 15,
wherein the first counter is triggered in response to a PUSH PACKET signal, and the second counter is triggered by a POP PACKET signal.

20. The method as set forth in claim 15, wherein:
storing the length and data packet in the memory comprises using a first pointer; and further comprising:
retrieving the data packet from the memory using a second pointer; and
comparing outputs of the pointers and generating a signal indicating that the memory is full when the outputs are equal.

* * * * *